UNITED STATES PATENT OFFICE.

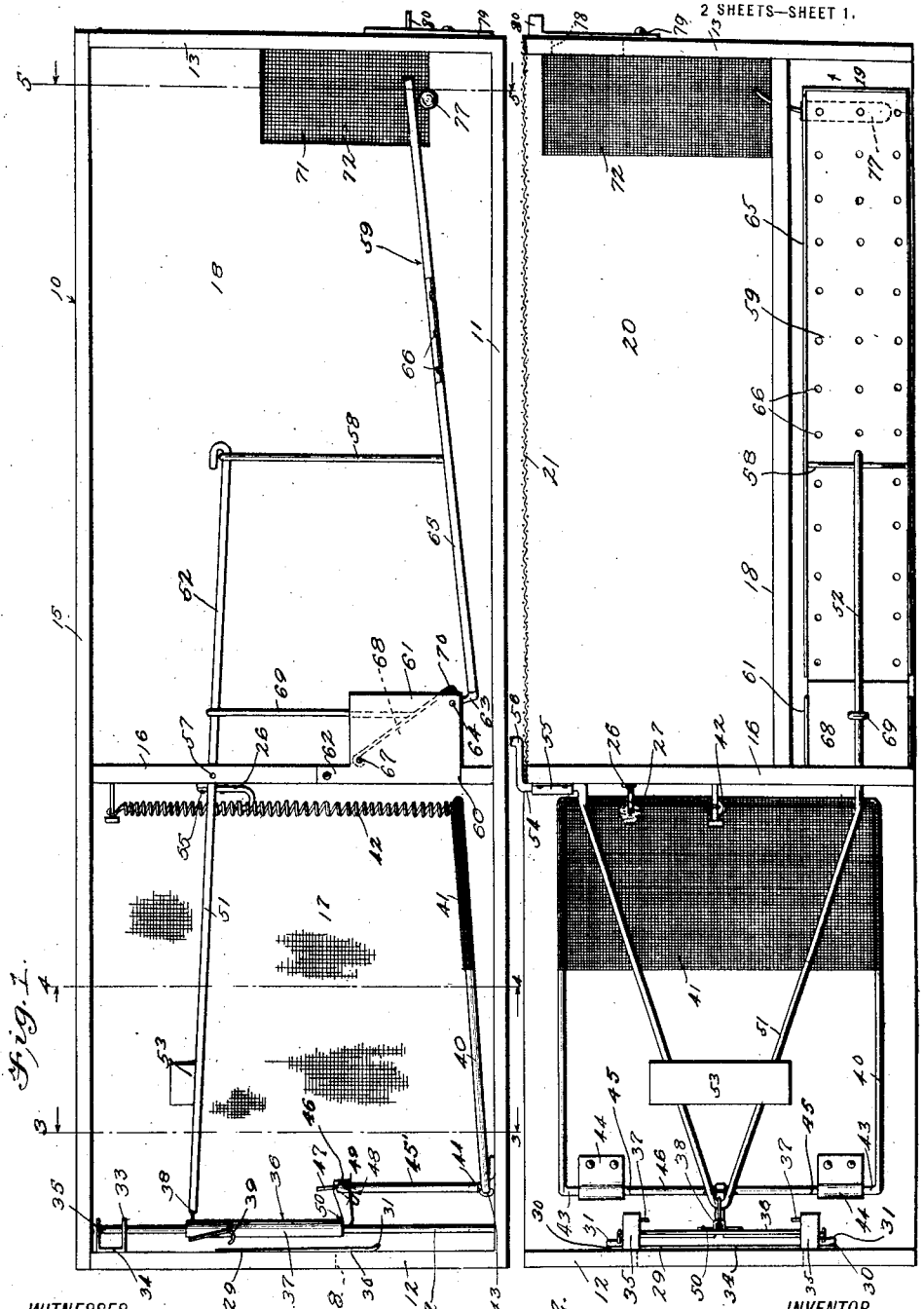

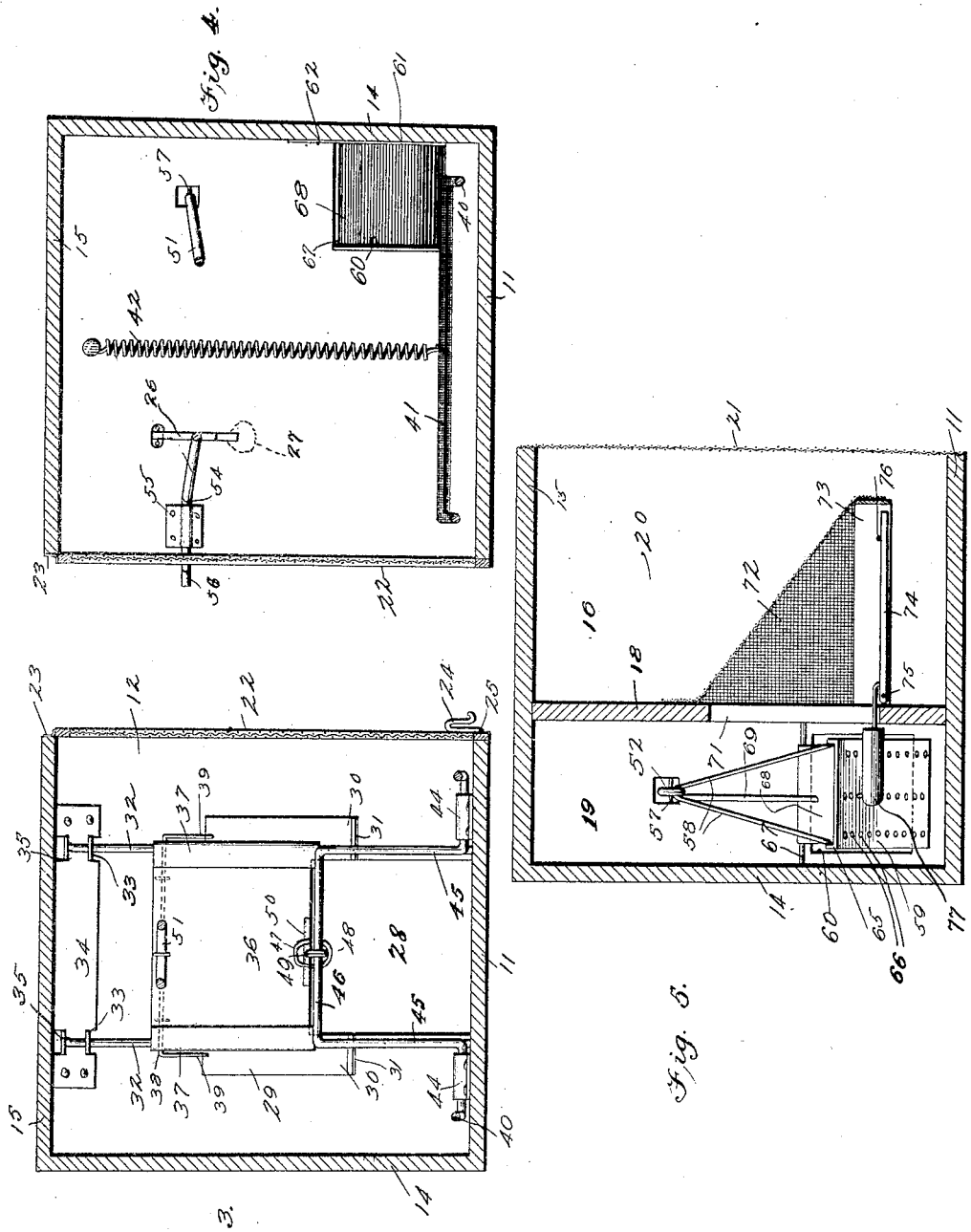

CLARENCE E. SPENCER, OF OVALO, TEXAS.

MOUSETRAP.

1,404,327.　　　　Specification of Letters Patent.　　Patented Jan. 24, 1922.

Application filed December 28, 1920. Serial No. 433,599.

*To all whom it may concern:*

Be it known that I, CLARENCE E. SPENCER, a citizen of the United States, and a resident of Ovalo, in the county of Taylor and State of Texas, have invented certain new and useful Improvements in Mousetraps, of which the following is a specification.

This invention relates to an improved mouse trap, although I desire to have it understood that the device may be made in various proportions and sizes without departing from the spirit of the invention, and thereby used for catching other rodents.

The invention contemplates the provision of a novel trap structure by which animals of the type specified, may be caught alive and which when initially set, will be subsequently reset each time an animal enters the same, thus obviating the usual attention required of traps which must be reset manually by the user for reuse.

A further object of the invention is to provide a trap having a plurality of compartments, one of which is used to contain the bait and into which the entrance opening leads, said opening being provided with a novel form of sliding trap door with means to hold the same in a closed position, and trigger means within the bait compartment or room to retain the door in an open position until such time as the animal enters and causes the release of the door so that it may move to a closed position upon the animal treading or bearing upon the trigger platform or stand in an attempt to nibble at or obtain the bait. The trap is also provided with a further compartment at one side adapted to contain a gang way or platform having connection with a weighted lever, which in turn has connection with the trap door, in order to normally hold the latter in a closed position and to close the same when released from an open position as above specified, said lever also serving to actuate a guard door to prevent the escape of the animal from the gang way compartment, as the animal passes along the gang way into a cage or prison compartment through the medium of a drop door or tilting platform in which the animal is retained, until it is desired to discharge the same.

A further object of the invention is to simplify the structure of the trap as well as to render the same positive in operation, and provide means for facilitating the baiting of the trap.

Other and further objects of my invention will become readily apparent to those skilled in the art from a consideration of the following description, taken in conjunction with the accompanying drawings, wherein—

Figure 1 is a side elevation of the improved mouse trap, the side walls being removed.

Figure 2 is a plan view with sides and top removed.

Figure 3 is a transverse sectional view taken on the line 3—3 of Figure 1 and looking in the direction indicated by the arrows.

Figure 4 is a similar sectional view taken on the line 4—4 of Figure 1 and looking in the opposite direction as indicated by the arrows, and Figure 5 is a transverse sectional view taken on the line 5—5 of Figure 1 and looking in the direction corresponding to the section line 3—3, as also indicated by the arrows.

Referring to the drawings in detail, in which like reference characters designate corresponding parts, throughout the several views, my improved mouse trap is shown as comprising a relatively elongated rectangular or oblong frame or receptacle 10, having the bottom 11 of wood or other suitable material, end walls 12 and 13 and side wall 14 which may be solid, or any other suitable material, such as wire mesh. The top is indicated at 15, while arranged vertically and transversely is a partition 16 arranged to one side of the longitudinal center, whereby a bait compartment 17 is provided at one end between the wall 12 and the partition 16.

To one side of the transverse center is arranged a partition 18 running longitudinally and vertically between the partition 16 and the end wall 13, thus providing a relatively narrow gang way compartment 19 and a cage or prison compartment 20 at the opposite side of the longitudinal partition. The compartment 20 is preferably closed on one side by wire mesh or the like 21 forming the side wall, while the compartment 17 at the same side is preferably provided with a hinged wall or closure in the form of a door 22 hinged to swing upwardly and outwardly while the lower edge is retained against the edge of the bottom wall and closed, by means of a pivoted catch 24 preferably in the form of a piece of wire of U-shape in formation, having one end directed inwardly, as indicated at 25, and pivotally supported in the bottom of the frame, receptacle or closure forming the trap proper. In this way, the catch may be turned to permit opening of the door, in order to obtain access to the baiting compartment 17, for the purpose of renewing the bait, as will be hereinafter more particularly set forth. Arranged in the bait compartment and secured to the vertical transverse partition 16, is a hook or like bait supporting means 26 in convenient reach of the door side for suspending the bait 27 thereon, and for renewing the same when necessary.

The front end wall 12 is provided with a door opening 28 and secured to the inner face of the end wall 12 is a plate 29 having a bifurcated lower end spanning the opening 28 to produce furcations 30 the lower ends of which are directed upwardly and inwardly as indicated at 31. Arranged vertically at either side of the door-way 28 or opening producing the same, are two vertical guide rods 32 having their lower ends engaging sockets in the bottom 11 and their upper ends anchored against movement by engagement with apertured ears 33 struck up from a plate 34 at the bottom edge of the latter and at spaced points, ears 35 being struck from the top edge of the plate and bent downwardly to engage the upper ends of the rod and prevent displacement thereof. The ears 33 are perforated to receive the rods 32 therethrough, thus retaining the rods in convenient position and in parallel relation to each other, while the ears 35 are imperforate and prevent the rods from becoming displaced while permitting the same to be placed in position or removed when desired by bending the ears upwardly, as it is thought will be obvious. The trap or slide door is designated at 36 and is slidably engaged with the guide rods 32 the opposite ends thereof being bent inwardly to form guide ways 37 for this purpose, whereby the door may be free to slide vertically on the guide rods to open or closed positions in the operation of the trap. As will be noted, the guide rods 32 are spaced from the front wall but sufficiently close to the same in order that the door when closed will prevent the passage of the animal between the front wall and the door. Pivotally mounted horizontally of the door near its upper edge, is a crank rod 38 having the ends directed downwardly and terminating at their lower extremities in forwardly directed hooks 39 designed when the door is closed to engage beneath the projections or keepers 31, thus preventing the mouse or other rodent from opening or raising the door and escaping, when the victim is once lodged within the trap and particularly in the bait compartment thereof.

Mounted on the bottom 11 and within the bait compartment is a trigger 40, said trigger being preferably in the form of a wire loop of rectangular outline having one end provided with a platform or pan 41 preferably of wire mesh and disposed at that end adjacent to the bait or bait support, to which end is connected a retractile coiled spring 42 at the lower extremity of the latter, the upper extremity of the spring being anchored to the partition 16 so as to normally elevate the platform or pan portion 41 of the trigger at the inner end of the latter. The sides of the rectangular loop forming the trigger are directed inwardly adjacent to the end wall 12 as indicated at 43 and are pivotally mounted in bearings or brackets 44, said inwardly extended portions 43 being extended toward each other in opposite directions and then upwardly substantially at right angles and at an acute angle to the trigger proper as shown at 45 and terminating in a cross bar 46 intermediately of which are secured upwardly and downwardly extending loops 47 and 48 serving to limit the pivotal movement upwardly and downwardly thereon, of a gravity operated latch or pair of trigger fingers 49 of tapered formation. The lower edge of the door 36 is struck at an angle, as indicated at 50 and when the door is raised or elevated on the guide rod, the fingers 49 engage the struck up portion 50 so as to retain the door in an open position. In this position, the platform portion 41 of the trigger is elevated by the spring 42, the fingers 49 being engaged beneath the portion 50. However, when the animal treads upon the trigger platform, the spring 42 is expanded, in an attempt to nibble or obtain the bait, and the trigger and frame thereof is depressed so as to swing the upright finger carrying portion of the trigger inwardly to draw the fingers 49 from beneath the door and permit the latter to move to a closed position or drop in front of the door opening 28.

In order to assist in the closing action of the door, there is connected to the latter through the medium of the crank rod 38 at the inwardly extending crank portion thereof, intermediately of the side edges of the door, the V-shaped end portion or bight portion 51 of a lever 52, which latter is weighted as indicated at 53 to cause the end thereof connected to the door to normally drop. One leg of the V-shaped portion 51 is directed outwardly as shown at 54 and pivotally mounted in a bearing 55, the extremity thereof being formed into a handle 56 by which the door may be raised or lowered to open or close the same manually in initially setting the trap, without opening the door or closure 22 after the device has been baited.

The opposite leg of the V is extended to produce the lever proper and while the leg is supported against the base of the vertical transverse partition 16 within the bait compartment, the lever 52 is pivoted as shown at 57, through an aperture in said partition, the free extremity of the lever serving by means of a bail 58 to suspend a gang way or platform 59 running longitudinally of the compartment 19.

In the partition 16 and leading from the bait compartment into the gang way compartment 19, is a passage 60, the latter being provided at the bottom and sides with an enclosure 61, preferably of sheet metal, bent as shown, and secured to the edge wall of the opening and to the vertical edge of the partition 16 as through the medium of an upwardly extended tongue 62. This sheet metal contrivance forms a passage, run or chute through which the animal may pass from the bait compartment into the gang way compartment 19 and onto the gangway 59 which latter is provided with an upwardly extended lower extremity 63 pivoted between the sides of said passage 61, as indicated at 64. This gang way is preferably of sheet metal and is provided with side flanges 65, as well as provided with a series of perforations 66 or otherwise formed with a roughened tread surface to facilitate the travel of the animal or rodent along the same.

Also pivoted between the sides of the member 61 adjacent to the partition as distinguished from the location of the pivot 64 and diagonally opposite and above the latter, as shown at 67 is a swinging door 68 connected by a rod 69 intermediately, to the lever 52 adjacent to the pivot point thereof, the rod 69 being looped or otherwise loosely connected to the lever. This guard door has its lower extremity bent in angular relation to overlie the pivoted portion 63 of the gang way or platform 59 and serves to close the passage 60 when the animal passes from the bait compartment through said passage and onto the gang-way or platform so that the weight will counteract the weight 53 and swing the lever 52 on its pivot, whereby the door 36 will be raised to an open position, there to be automatically held by the trigger under the action of the spring 42, thus providing a trap which is automatically reset after being initially set manually with the manifest advantages accruing therefrom.

It will thus be seen that the only way of escape from the bait compartment is as just described, and in order that the animal may pass into the cage or prison compartment 20, an opening 71 is provided in the partition 18 adjacent to the end wall 13 and slightly elevated from the bottom 11 so that the free upper end of the gangway will be disposed adjacent to the sill thereof when in lowered position so that the animal may pass into the compartment 20. Projecting into the latter compartment around the opening 71 is a screen guard 72 preferably having a metal frame 73 at the bottom serving in conjunction with the end wall 13 to pivotally support a trap door or platform 74. This platform is pivoted adjacent to the partition 18 as indicated at 75 and the free end thereof is adapted to move downwardly into contact with the bottom 11, while being limited in its upward movement by a rod or bar 76 across the free end of the frame 73, under the action of a weight 77 carried by an arm secured to the door or platform 74 and projecting through the opening 71 and into the compartment 19 so as to normally retain the door in a closed position. However, as soon as the animal steps from the gang-way onto the trap door or platform 74, it will be precipitated into the compartment 20, against escape. In order to discharge the cage or prison compartment 20 of the trap, an exit opening 78 is provided in the end wall 13 closed by a pivoted plate or door 79 having a gripping portion 80 by which it may be raised or lowered. In this way, the animals after being caught may be discharged from the trap for destroying them.

In view of the foregoing, it is thought that the operation of the device will be readily understood, and in view of the simplicity and practical value, that it will commend itself to those skilled in the art.

Having thus fully described my invention what I claim as new and desire to secure by Letters Patent is:—

1. A mouse trap comprising an elongated box like receptacle having an entrance opening in one end and an exit opening in the other, a transverse partition across the box, a longitudinal partition running between the transverse partition and the exit end, said transverse partition forming a bait compartment with the entrance end wall, and the longitudinal partition forming a gangway compartment and a prison compartment on opposite sides thereof, with said transverse partition and the opposite end wall, bait supporting means carried by the transverse partition within the bait compartment, a vertically slidable door cooperating with the entrance opening, means to hold the door in a closed position and against raising by the animal within the bait compartment, a trigger member pivoted in the bait compartment and having an upright portion provided with fingers cooperating with the door to hold the latter elevated, and a tread portion adjacent to the bait adapted upon being depressed to release said door, a lever pivoted in the transverse partition and having connection with said door, said lever being weighted to normally close the door, and adapted when raised to release the means for holding the door closed, and means for actuating said lever.

2. A mouse trap comprising an elongated box like receptacle having an entrance opening in one end and an exit opening in the other, a transverse partition across the box, a longitudinal partition running between the transverse partition and the exit end, said transverse partition forming a bait compartment with the entrance end wall, and the longitudinal partition forming a gangway compartment and a prison compartment on opposite sides thereof, with said transverse partition and the opposite end wall, bait supporting means carried by the transverse partition within the bait compartment, a vertically slidable door cooperative with the entrance opening, means to hold the door in a closed position and against raising by the animal within the bait compartment, a trigger member pivoted in the bait compartment and having an upright portion provided with fingers cooperating with said door to hold the latter elevated, and a tread portion adjacent to the bait adapted upon being depressed to release said door, a lever pivoted in the transverse partition and having connection with said door, said lever being weighted to normally close said door, and adapted when raised to release the means for holding the door closed, said means including a gangway in the gangway compartment and connected to the lever, a closure for said bait compartment, and independent means controlling the passage of the animal from the bait compartment into the gang way compartment and from the gang way compartment into the prison compartment, said means controlling the passage of the animal from the bait compartment into the gang-way compartment being also connected with the lever.

3. A mouse trap comprising a box like receptacle having an entrance opening in one end and an exit opening in the other, a transverse partition across the box, a longitudinal partition running between the transverse partition and the exit end, said transverse partition forming a bait compartment with the entrance end wall, and the longitudinal partition forming a gang way compartment and a prison compartment on opposite sides thereof, the said transverse partition and the opposite end wall, bait supporting means carried by the transverse partition within the bait compartment, a vertically slidable door cooperative with the entrance opening, means to hold the door in a closed position and against raising by the animal within the bait compartment, a trigger member pivoted in the bait compartment and having an upright portion provided with fingers cooperating with said door to hold the latter elevated, and a tread portion adjacent to the bait adapted upon being depressed to release said door, a lever pivoted in the transverse partition and having connection with said door, said lever being weighted to normally close said door, said lever extending beyond said transverse partition, said partition having an opening therethrough a door cooperating with said opening and having connection with the lever for raising and lowering the same so as to be closed when the first named door is open and open when the first named door is closed, a gang plank pivoted to said transverse partition and also connected with the free end of the lever so as to be actuated by the weight of the animal passing from the bait compartment, and a non-return entrance door controlling the passage of the animal from the last named compartment into the compartment at the opposite side of the longitudinal partition.

4. A rodent trap comprising a relatively elongated box-like receptacle having an entrance opening in one end and an exit opening in the other, a door cooperating with said exit opening, a transverse partition in the box and dividing the same longitudinally, a longitudinal compartment between said transverse partition and the exit end and dividing the same transversely, said partitions producing a bait compartment, a gang-way compartment and a prison compartment, an opening being formed in the partition between the bait compartment and leading into the gangway compartment, and an opening being formed in the longitudinal partition leading from the gangway compartment into the prison compartment, a pair of spaced guide rods supported at the inner face of the entrance end, a door having portions slidably engaged with said rods, a lever weighted adjacent one end, and pivoted in the transverse partition, said lever being connected with the door, depressible means for holding the door in an elevated position and for releasing the same in the attempt of an animal to obtain the bait from the bait compartment, whereby the door may be swung to a closed position under the action of the weight, said lever having a handle portion for setting the trap, a pivoted gang-way in the gang-way compartment, and having a door controlled thereby to close the opening leading from the bait compartment into said gang-way compartment, and a caged drop door controlling the communication between the gang-way compartment and the prison compartment and serving to prevent escape from the prison compartment into the gangway compartment.

5. A rodent trap comprising a closed receptacle having top and bottom walls, end walls and side walls, a transverse partition dividing the same, and a longitudinal partition extending from the transverse partition to the end wall at one end, the entrance end having a door opening, a plate secured to said end wall and having furcations straddling said opening and directed away from said wall, a plate secured above the first named plate and having spaced apertured ears, guide rods engaging with said ears and with the bottom wall, said plate having ears bent in contact with the upper ends of the rods to retain the rods in position, a vertically slidable trap door having end portions bent to slidably engage said rod, a crank rod pivoted to the door adjacent the upper end thereof and having depending hooks the ends thereof to engage said furcations to retain the door in a closed position, a lever pivoted in the transverse partition and having a weight adjacent to the door end thereof, said latter end being connected to the crank portion of the crank rod, a frame like trigger pivoted adjacent to said door and having tapered fingers cooperating with the door to support the same in an opened position when raised, said trigger having a tread portion adapted on being depressed to release said door, said transverse partition having an opening, a casing around said opening, a door hinged within said casing and connected with the lever to act oppositely to the sliding door, a run-way pivoted to said casing and connected to the free end of the lever, said run-way being normally inclined when the sliding door is closed by the weight and adapted upon being depressed to actuate said doors, the longitudinal partition having an opening adjacent to which said gang-way is disposed when lowered, a cage adjacent said opening, a pivoted drop door at the bottom of said cage adapted to precipitate the animal into the said compartment upon passing onto the same, and a door controlled exit for said compartment.

CLARENCE E. SPENCER.